US005573091A

United States Patent [19]

Hung

[11] Patent Number: 5,573,091

[45] Date of Patent: Nov. 12, 1996

[54] ELECTRICALLY POWERED OR MANUALLY DRIVEN CLUTCH AND BRAKE ASSEMBLY FOR ELECTRIC WINCH

[76] Inventor: Michael Hung, 9-16, Nan Kan Hsia, Nan Kan, Lu Chu Hsiang, Tao Yuan County, Taiwan

[21] Appl. No.: 352,517

[22] Filed: Dec. 9, 1994

[51] Int. Cl.$^6$ .................................................... B60K 41/24

[52] U.S. Cl. ........................ 192/12 R; 192/12 D; 192/19; 74/421 R; 254/323; 254/348; 254/356; 254/362

[58] Field of Search ................................ 192/12 D, 12 R, 192/17 R, 19; 74/413, 421 R; 254/323, 346, 347, 350, 356, 375, 362

[56] References Cited

U.S. PATENT DOCUMENTS

| | | | |
|---|---|---|---|
| 1,936,713 | 11/1933 | Freeman et al. | 192/12 R X |
| 2,525,402 | 10/1950 | Dehn | 254/347 X |
| 3,051,447 | 8/1962 | Ahlbin | 254/347 |
| 4,004,780 | 1/1977 | Kuzarov | 254/347 X |
| 4,175,727 | 11/1979 | Clarke | 192/12 R X |
| 4,553,738 | 11/1985 | Plummer et al. | 254/358 |
| 4,588,167 | 5/1986 | Finzel | 254/346 |
| 5,291,601 | 3/1994 | Hanada et al. | 74/421 R X |
| 5,374,035 | 12/1994 | Santos | 254/323 X |

FOREIGN PATENT DOCUMENTS

| | | | |
|---|---|---|---|
| 2030259 | 4/1980 | United Kingdom | 192/12 R |

*Primary Examiner*—Andrea L. Pitts
*Attorney, Agent, or Firm*—Wenderoth, Lind & Ponack

[57] ABSTRACT

Electrically powered or manually driven clutch and brake mechanism for an electric wince cooperate with a transmission mechanism. The clutch mechanism is provided with a thrust bearing on a clutch shaft and a large clutch gear is then inserted thereon. A lining plate is attached to a clutch plate of the large gear and a pinion gear is attached tightly to the lining plate. Another thrust bearing is placed behind the pinion gear and a compression spring is inserted on the clutch shaft. The large and the pinion gears can be pushed tightly together or loosened as a function of resiliency of the spring. A clutch hand wheel can be provided for manual operation. In addition, the brake mechanism is designed such that a rotating shaft of a motor is provided with a disc brake which has a unidirectional bearing. The disc brake can be squeezed tightly by disc pads. A heavy load can thus be pulled by a cable of the wince, either manually or driven by power, and a braking force can be generated to prevent the heavy load from sliding in a reverse direction.

2 Claims, 4 Drawing Sheets

ELECTRICALLY POWERED OR MANUALLY DRIVEN CLUTCH AND BRAKE ASSEMBLY FOR ELECTRIC WINCH

BACKGROUND OF THE INVENTION

1. Field of the Invention

The present invention relates to an electrically powered or manually operable clutch and brake assembly for an electric winch, particularly to a new design of a clutch mechanism, a brake mechanism and a transmission mechanism used in the electric winch.

2. Description of the Prior Art

A conventional electric power driven winch uses a transmission mechanism and a rotating shaft of a motor to drive a large clutch gear which is provided with a lining plate. The lining plate is coupled with a clutch pinion gear which is used to drive the transmission mechanism so that a shaft can be rotated to pull a heavy load. When the motor stops running, a ratchet-type component is used to retain the large clutch gear and generate a braking force so as to prevent the heavy load from reverse movement. However, the conventional electric power driven wince has the following drawbacks:

(1) A locking nut is used to push the large and pinion gears of the clutch together tightly, forcing lining plates provided between the clutch plates to push against each other. However, it is common to have vibration in the winch during operation, causing the locking nut to retreat and loosen due to such vibration.

(2) The locking nut used to tighten the large and pinion gears is applied in the axial direction, forcing the lining plate provided on the surface of the clutch plate to push tightly against the pinion gear. This direct pushing by the locking nut does not provide any cushion for the large and pinion gears of the clutch. Thus, thrust bearings on opposite sides of the gears have to bear a heavy load, causing them to wear out quickly. This also means that the wince will have a more troubled operation and will require more maintenance.

SUMMARY OF THE INVENTION

The main object according to the present invention is to provide electrically powered or manually driven clutch and brake assembly for an electric winch, wherein a lining plate between a large clutch gear and a pinion gear is pushed tightly by a compression force in the direction of the shaft to drive a transmission mechanism. The compression force is generated when a hand wheel is tightened to compress a compression spring. The greater the tightening of the hand wheel, the greater the compression force. This force is not as great as the force generated by directly pushing the large and pinion gears together by a lock screw according to the prior art. Therefore, thrust bearings on opposite sides of the gears will not be worn out due to a heavy load.

Another object according to the present invention is to provide an electrically powered or manually driven clutch and brake assembly for an electric winch wherein the large gear and the pinion gear of the clutch are pressed by the compression spring, thus providing a buffering force when the gears are rotating, such buffering force preventing the hand wheel from loosening due to vibration.

A further object according to the present invention is to provide an electrically powered or manually driven clutch an brake assembly for an electric wince in which a rotating shaft of a motor is provided with a brake disc which has a unidirectional bearing, the brake disc being squeezed tightly by brake pads. By such configuration, when the rotating shaft of the motor is rotating, or when rotation is caused manually, the unidirectional bearing of the disc brake itself rotates. If the motor is stopped, the heavy load pulls backwardly to generate rotation in a reverse direction. The brake disc and brake pads, together with the motor, generate a braking force to prevent the motor from reverse rotation and reverse movement of the heavy load.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF PREFERRED EMBODIMENT

Figure 1:
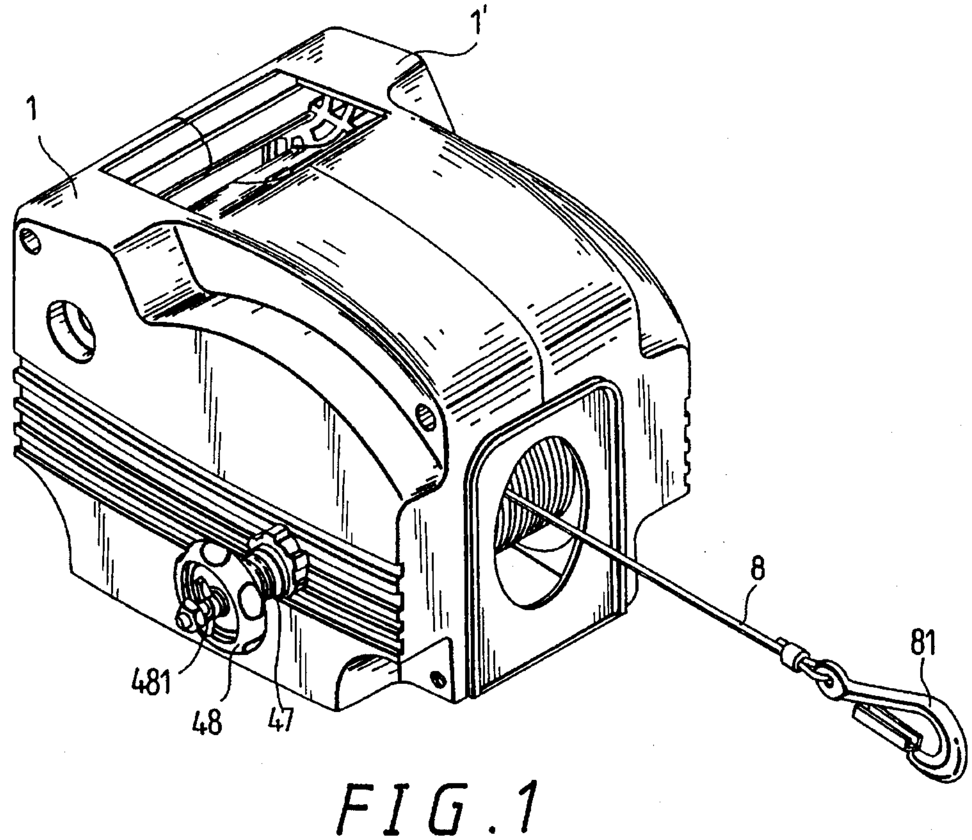
FIG. 1 is a perspective view of an embodiment according to the present invention.

As shown in the drawings, a power or manual driven clutch and braking assembly for an electric winch according to the present invention mainly includes two bodies 1 and 1', a mounting base 2, a motor 3, a clutch mechanism and a transmission gear mechanism. The mounting base 2 is provided with a reel shaft 7 for reeling a cable 8. A front end of the cable 8 is provided with a hook 81. The above mentioned bodies 1 and 1', the mounting base 2, the shaft 7 and the cable 8 are already known in a power driven winch and therefore are not further described herein.

Figure 4:
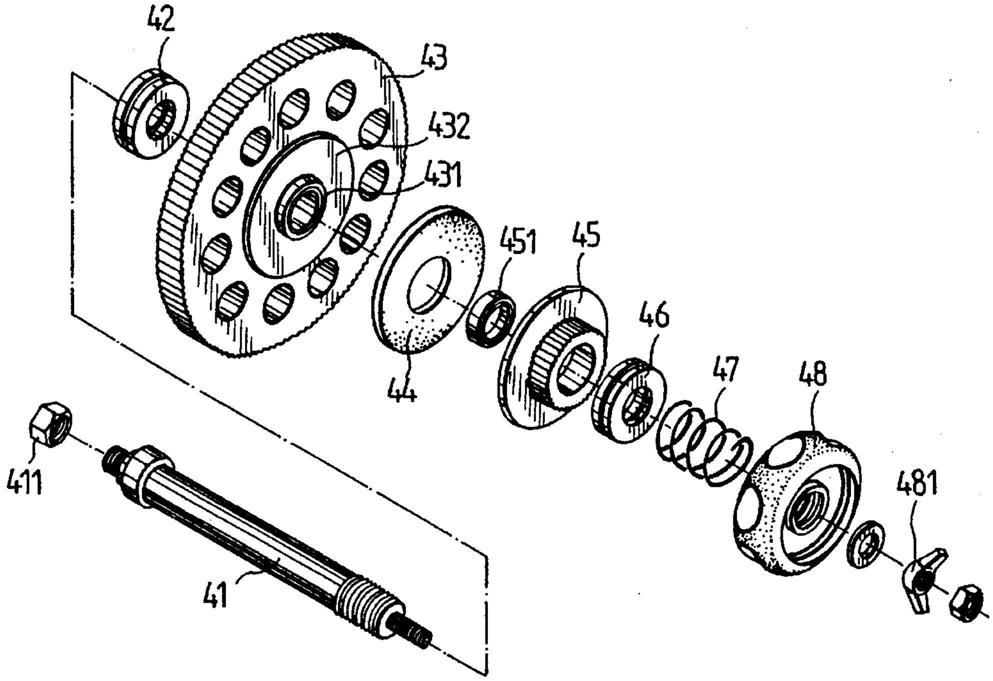
FIG. 4 is an exploded perspective view of a clutch mechanism employed according to the present invention.
Figure 2:
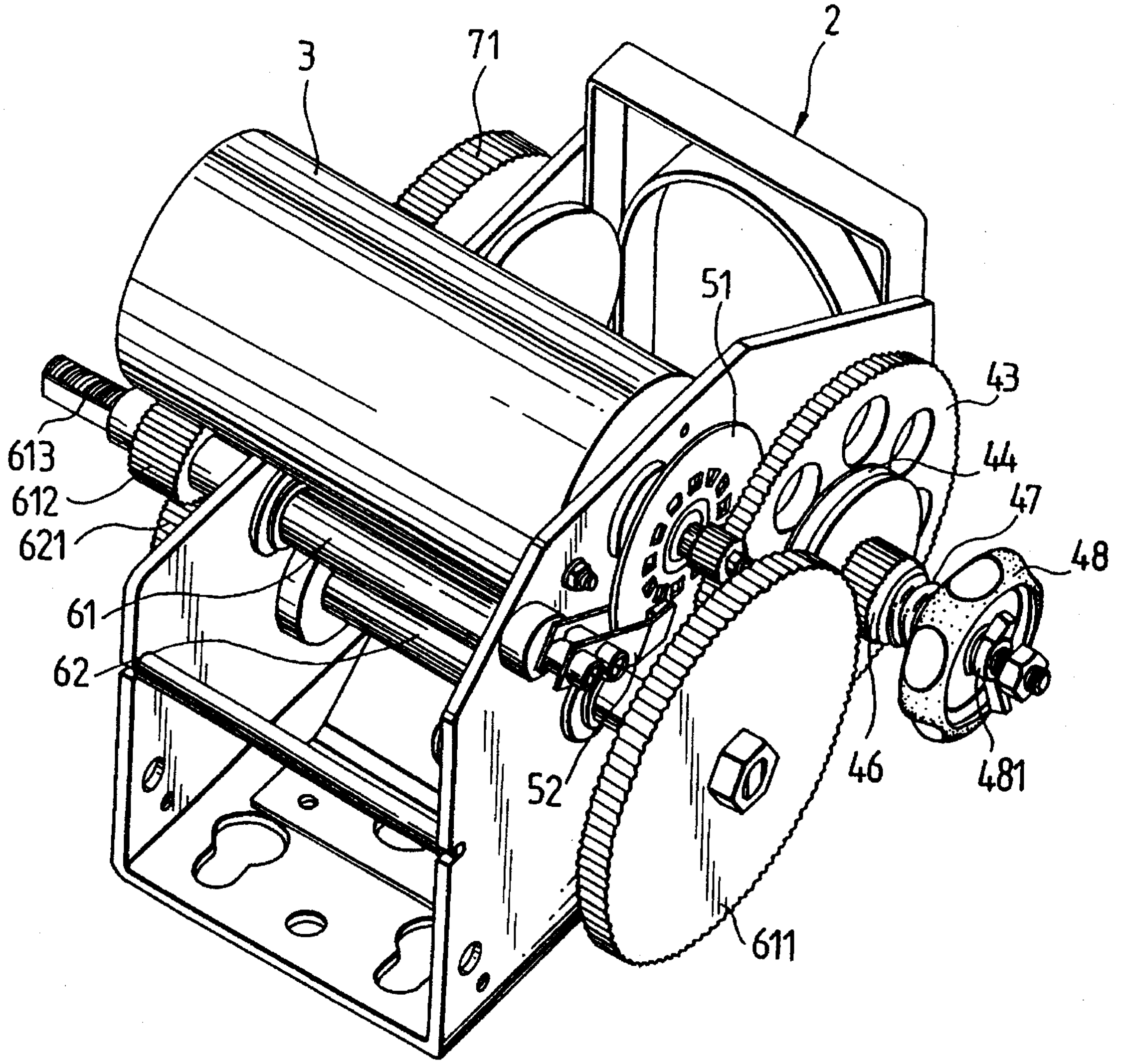
FIG. 2 is a perspective view of the present invention.

The clutch mechanism is shown in FIG. 4. One end of a clutch shaft 41 is secured to the mounting base 2 by a nut 411. A thrust bearing 42 is mounted on clutch shaft 41, a large clutch gear 43 with a needle bearing 431 is mounted behind the thrust bearing 42. A clutch plate 432 of the large gear 43 is provided with a lining plate 44. In addition, the shaft 41 is provided with a clutch pinion gear 45, which has a needle bearing 451. A thrust bearing 46 is mounted in front of the pinion gear 45, and a compression spring 47 is inserted into the shaft 41. A clutch hand wheel 48 is then inserted onto the end of the shaft 41, and a wing nut 481 is used to secure and mount the thus formed clutch mechanism on the mounting base 2.

Figure 6:
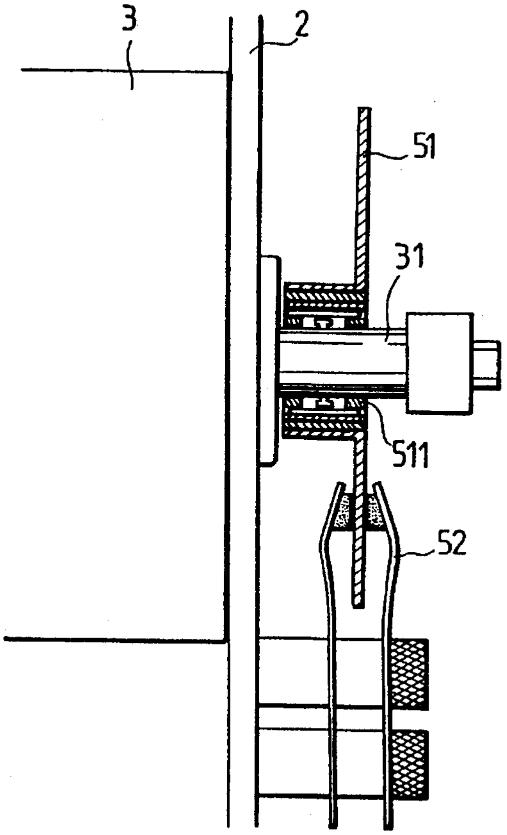
FIG. 6 is a sectional view of a brake mechanism employed according to the present invention.

The brake mechanism is shown in FIG. 6. A rotating shaft 31 of the motor 3 is provided with a brake disc 51 which has a unidirectional bearing 511. The brake disc 51 can be squeezed tightly by brake pads 52 that are mounted and secured on the mounting base 2.

The transmission gear mechanism has a first or rear shaft 61 and a transmission shaft 62 secured onto the mounting base 2. A large gear 611 on one end of the rear shaft 61 meshes with the pinion gear 45 on the clutch shaft 41, and a pinion gear 612 on the other end of the rear shaft 61 drives a transmission gear 621 on the transmission shaft 62. A transmission pinion gear 622 on the transmission shaft 62 then meshes with a large reel gear 71 on the reel shaft 7 so as to rotate the shaft 7.

By use of the above configuration, the clutch hand wheel 48 of the wince can be loosened, allowing the large clutch gear 43 and the pinion gear 45 to be detached from each other. Cable 8 then can be pulled out easily. The hook 81 at the front of the cable 8 can be attached to a load, and the clutch hand wheel 48 then can be tightened. Thus, the compression spring 47 is compressed and presses the pinion gear 45 tightly toward large gear 43. The shaft 7 of the wince then can be rotated manually or driven by electric power, enabling cable 8 to be wound or coiled so as to pull the heavy load attached to the hook 81.

The lining plate 44 between the large clutch gear 43 and the pinion gear 45 is tightly clamped by the force of the spring acting in the direction of the shaft. This compression force is generated when the hand wheel 48 is tightened, thus compressing the compression spring 47. The greater is such movement of the hand wheel 48, the greater is the compression force. However, this force is not as great as a force generated by directly pushing the large and the pinion gears 43 and 45 together with a lock screw. Therefore, the thrust bearings 42 and 46 on the opposite outer sides of gears 43 and 45 will not be worn out due to a heavy load. In addition, since the large clutch gear 43 and the pinion gear 45 are pressed by the compression spring 47, there is a buffering force when the gears are rotating, and this buffering force prevents the hand wheel 48 from being loosened due to vibration.

Figure 3:
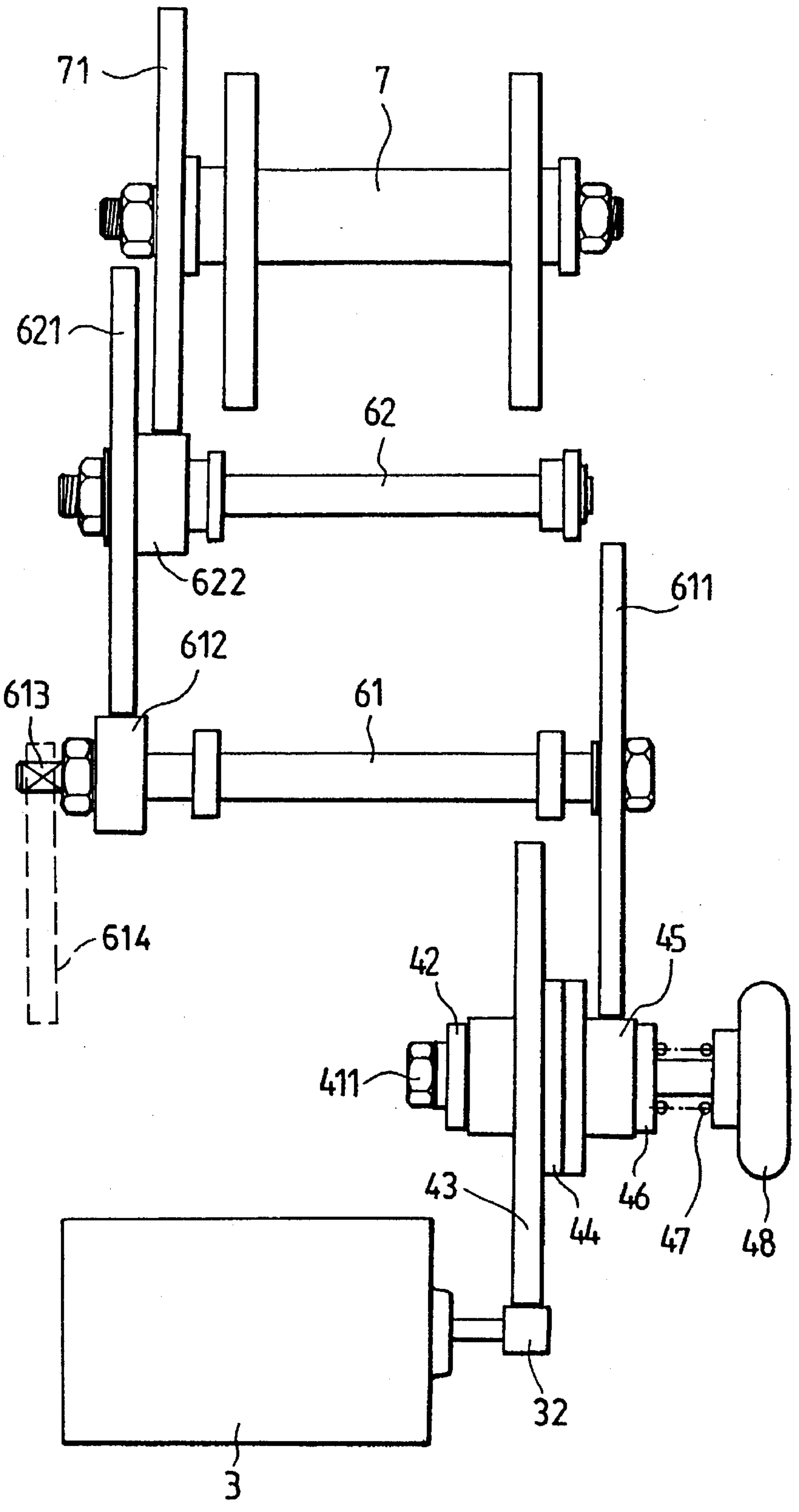
FIG. 3 is an illustrative view of a transmission gear mechanism employed according to the present invention.
Figure 5:
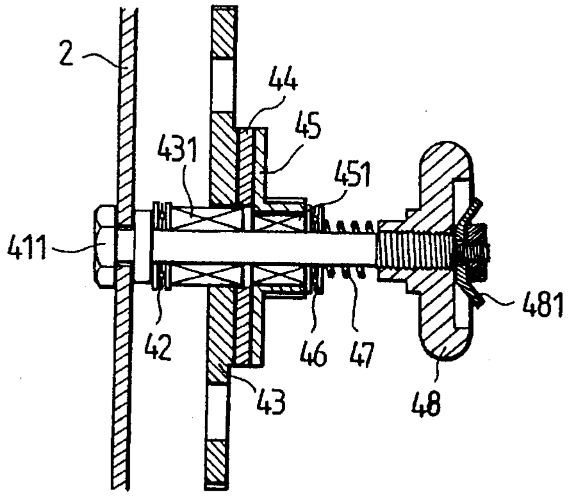
FIG. 5 is a sectional view of the clutch mechanism according to the present invention.

Referring to FIG. 3, when power is supplied to motor 3, a gear 32 of the motor shaft 31 drives the large clutch gear 43. The pinion gear 45 abutting the lining plate 44 provided on the clutch plate 432 of the large clutch gear 43 drives the large gear 611 on the rear shaft 61. The small gear 612 on the other end of the rear shaft 61 then transmits its rotation to the transmission gear 621 of the transmission shaft 62. The transmission pinion gear 622 on the transmission shaft 62 is provided to mesh with gear 71 of shaft 7 so that the shaft 7 can be rotated. Through this series of gearing the speed of rotation is reduced, and the rotational force imparted to the shaft 7 is increased. Thus, the cable 8 can pull a heavy load easily.

The operation of the wince by use of motor 3 has been described above. When power is not available, the wince can be operated manually. A handle 614 can be inserted onto a projecting portion 613 of the rear shaft 61. The gears can be rotated manually, thus rotating shaft 7 for coiling up the cable 8.

When the electrically powered or manually driven clutch stops operation, the braking mechanism of the present invention provides control of the positioning of the load and prevents the load from sliding. The operation of the braking mechanism is as follows. The rotating shaft 31 of the motor 3 is provided with brake disc 51 which has unidirectional bearing 511. The brake disc 51 can be squeezed tightly by brake pads 52. By such configuration, when the rotating shaft 31 of the motor 3 is rotating, or when rotation is imparted manually, the unidirectional bearing 511 of the brake disc 51 is rotating. If the motor 3 is stopped, the heavy load imparts an opposite force to generate rotation in the reverse direction. The brake disc 51 and brake pads 52, together with the motor 3, generate a braking force to prevent the motor 3 from such reverse rotation and reverse movement of the heavy load.

It is to be understood that the foregoing description and accompanying illustrations are merely exemplary, and various changes and modifications to the preferred embodiment will be apparent to those skilled in the art. The scope of this invention is defined solely by the appended claims and their equivalents.

What is claimed is:

1. An electrically powered or manually operable clutch and brake assembly for an electric winch, said assembly comprising:

a mounting base;

a motor mounted on said mounting base and having a rotatable output shaft having thereon a gear;

a reel shaft mounted on said mounting base;

a clutch mechanism including a clutch shaft mounted on said mounting base, a large clutch gear mounted on said clutch shaft and meshing with said gear on said motor output shaft, said large clutch gear having a clutch plate with a lining plate, a clutch pinion gear mounted on said clutch shaft, a clutch hand wheel adjustably mounted on said clutch shaft, and a compression spring positioned between said clutch pinion gear and said clutch hand wheel and urging said clutch pinion gear toward said clutch large gear with a compression force that is variable as a function of the relative adjusted position of said clutch hand wheel on said clutch shaft;

a brake mechanism including a brake disc mounted on said motor output shaft by a unidirectional bearing enabling relative rotation between said brake disc and said motor output shaft in a first direction and preventing relative rotation therebetween in an opposite second direction, and brake pads mounted on said mounting base and operable to clamp therebetween opposite sides of said disc brake; and a transmission mechanism for transmitting rotation of said motor output shaft, via said clutch mechanism, to said reel shaft, said transmission mechanism including a first shaft mounted on said mounting base, a large gear mounted on said first shaft and in meshing engagement with said clutch pinion gear, a pinion gear mounted on said first shaft, a transmission shaft mounted on said mounting base, a transmission gear mounted on said transmission shaft and in meshing engagement with said pinion gear on said first shaft, a transmission pinion gear mounted on said transmission shaft, and a reel gear mounted on said reel shaft and in meshing engagement with said transmission pinion gears whereby loosening of said clutch hand wheel enables detachment of clutching drive of said clutch pinion gear and interruption of rotation of said reel shaft, and tightening of said clutch hand wheel enables engagement of clutching drive of said clutch pinion gear and transmission of rotation thereof by said transmission mechanism to said reel shaft.

2. An assembly as claimed in claim 1, further comprising a handle selectively engageable with said first shaft to enable manual rotation thereof and thereby of said reel shaft.

* * * * *